Jan. 15, 1935.   G. E. WATTS   1,987,882
ROTARY MOTOR
Filed June 20, 1933   2 Sheets-Sheet 1

GEORGE E. WATTS
INVENTOR

BY James D Givnan
ATTORNEY

Jan. 15, 1935.　　　G. E. WATTS　　　1,987,882
ROTARY MOTOR
Filed June 20, 1933　　2 Sheets-Sheet 2

GEORGE E. WATTS
INVENTOR

James L. Givnan
ATTORNEY

Patented Jan. 15, 1935

1,987,882

UNITED STATES PATENT OFFICE 1,987,882

ROTARY MOTOR

George E. Watts, Portland, Oreg.

Application June 20, 1933, Serial No. 676,684

2 Claims. (Cl. 121—88)

This invention relates to improvements in rotary motors and more especially to that type of motor in which a piston drum is rotatably mounted in a cylinder eccentric therewith, with a plurality of blades journaled eccentric with respect to the drum and projecting radially therefrom to contact with the cylinder walls as the drum rotates. The present invention relates to improvements in the type of motor shown and described in Letters Patent of the United States, numbered 1,836,037, dated December 15, 1931 covering "Air motors."

The eccentric arrangement of the drum with respect to the cylinder provides what might be termed crescent-shaped expansion chambers provided with intake and exhaust ports.

One of the principal objects of this present invention is to provide a motor of this character which is of simple, efficient, durable and light-weight construction which is particularly adapted for use in connection with aircraft engines for supercharging the carburetors thereof.

Another object of the invention is the provision, in a device of this character, of a seal between the intake and exhaust chambers, within the cylinder and over a portion of the periphery of the drum, where the drum is brought into pressureless contact with the inner periphery of the cylinder, and the provision of means for maintaining the blades in retracted position during their passage through the sealed area so as not to disturb the seal between the drum and the cylinder.

Another object of the invention is the provision of a device of this character which will function over relatively long periods of time at relatively high speeds without any mechanical failures thereby rendering the device particularly useful in connection with the operation of aircraft instruments, such as gyro-compasses, artificial horizons, bank and turn indicators and other similar flight instruments which are operated by air pressure or vacuum mechanically generated within the airplane and applied to said instruments, and wherein failure of the air generating or vacuum means would render the flying instruments of the aircraft inoperative and would obviously cause a forced landing of the aircraft.

It is to be understood that the foregoing does not prescribe the limits of utility of the device since it obviously is readily adaptable to many uses wherein a motor of light weight per unit of horse power and high speed dependable and durable operation are the main desiderata.

These and other objects will appear as my invention is more fully hereinafter described in the following specification, illustrated in the accompanying drawings, and finally pointed out in the appended claims.

In the drawings

Figure 1:
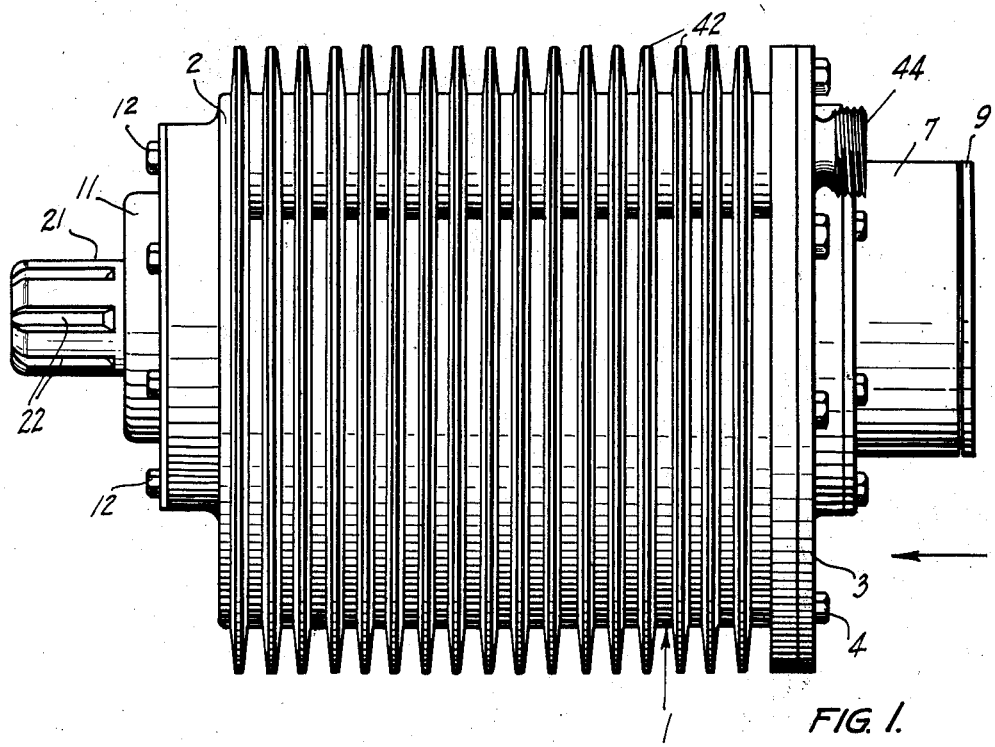
Figure 1 is a side elevation of my new and improved motor.
Figure 2:
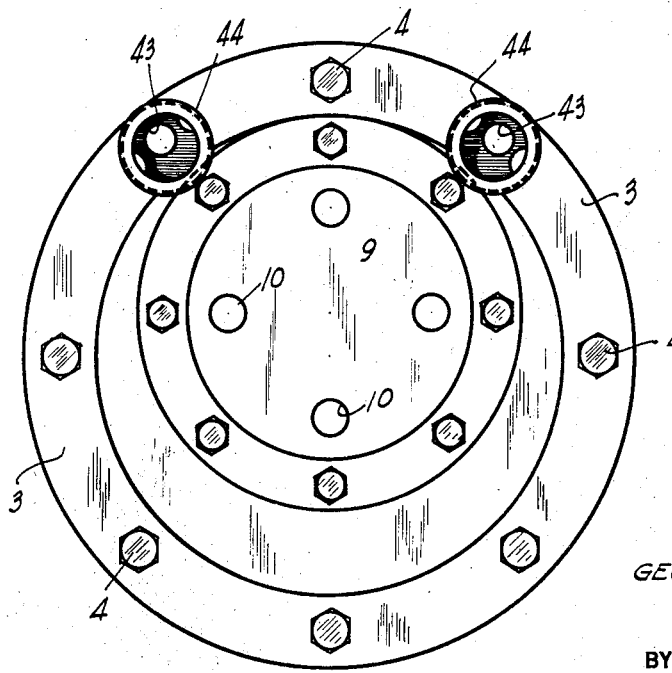
Figure 2 is an end elevation of Figure 1 looking in the direction of the arrow in Figure 1.

Referring now more particularly to the drawings:

Reference numeral 1 indicates generally the stationary main body of the motor, which is of open ended cylindrical form provided with an integral end wall 2 and a removable bell-shaped end member 3 which is secured to the cylinder 1 by any suitable means such, for instance, as the bolts 4. Antifriction bearings, of any suitable type such, for instance, as ball bearings 5 and 6, are mounted within the end walls of the cylinder as shown. To the outer face of the end member 3, I mount a housing 7 formed with an integral hub 8. The open end of the housing is provided with a closure cap 9 formed with apertures 10 for engagement with a spanner wrench or the like for removing the cap when it is desired to repack the housing with any suitable lubricant such as cup grease or the like. To the opposite end of the cylinder 1, I mount a retaining cap 11 which is bolted to the end wall 2 as at 12 and within which I provide a packing washer or the like indicated at 13, to retain and provide lubricant for the ball bearing 5. Within the cylinder 1, and rotatably mounted with respect thereto, is a drum 14. One end of the drum is formed with an integral end wall 15 which is provided at its center with an integral flanged hub 16. The hub 16 is shouldered as at 17 for firm engagement with the inner race of the ball bearing 6. The opposite end of the drum 14 is flanged as at 18 and shouldered as at 19 for engagement with a removable end bell 20 which at its central portion is reduced and extended into a hollow shaft 21, formed at its outer end with splines 22. The end member 20 is secured to the flanged and shouldered portion of the drum 14, by any suitable means, such, for instance, as machine screws, or the like (not here shown). The innermost end of the hollow shaft 21 is counterbored as at 23 to securely engage a ball bearing 24.

From the foregoing, it is plainly seen that the drum 14, end member 20 and shaft 21, all being secured together, rotate as a unit within the ball bearings 5 and 6. Extending longitudinally through the drum 14 is a stationary shaft 25 having one of its ends offset as at 26 and extended through the end wall 15 of the drum 14 and terminating within the hub 8 of the housing 7 where it is keyed to the hub by means of the key 27 to the inner and tapered periphery of the hub 8. The outermost end of the offset portion of the shaft is internally threaded to receive a hollow bushing 28 which is advanced on its threads until its flanged portion 29 abuts the outermost edge of the hub 8 to thereby serve as a lock nut in further securing the shaft in a fixed and immovable position with respect to the cylinder 1. The opposite end of the stationary shaft 25 is splined as at 30 for fixed engagement with a correspondingly splined disc or plate 31 which is provided at its upper end with a stub shaft 32 which is secured to the inner race of the ball bearing 24 by a driving fit. The inner race is thereby prevented from rotating during rotation of the drum 14 along with its end member 20 which rotates freely with the outer race of the ball bearing 24.

The shaft 25 is purposely made hollow to receive any approved type of lubricating wick or the like (not here shown) which may be extended from end to end thereof and projected out through the bushing 28 into the lubricant containing housing 7 and the lubricant thus introduced into the hollow shaft is subsequently fed out through oil holes 33 which are spaced apart throughout the length of the shaft 25 for the purpose hereinafter pointed out.

Figure 3:
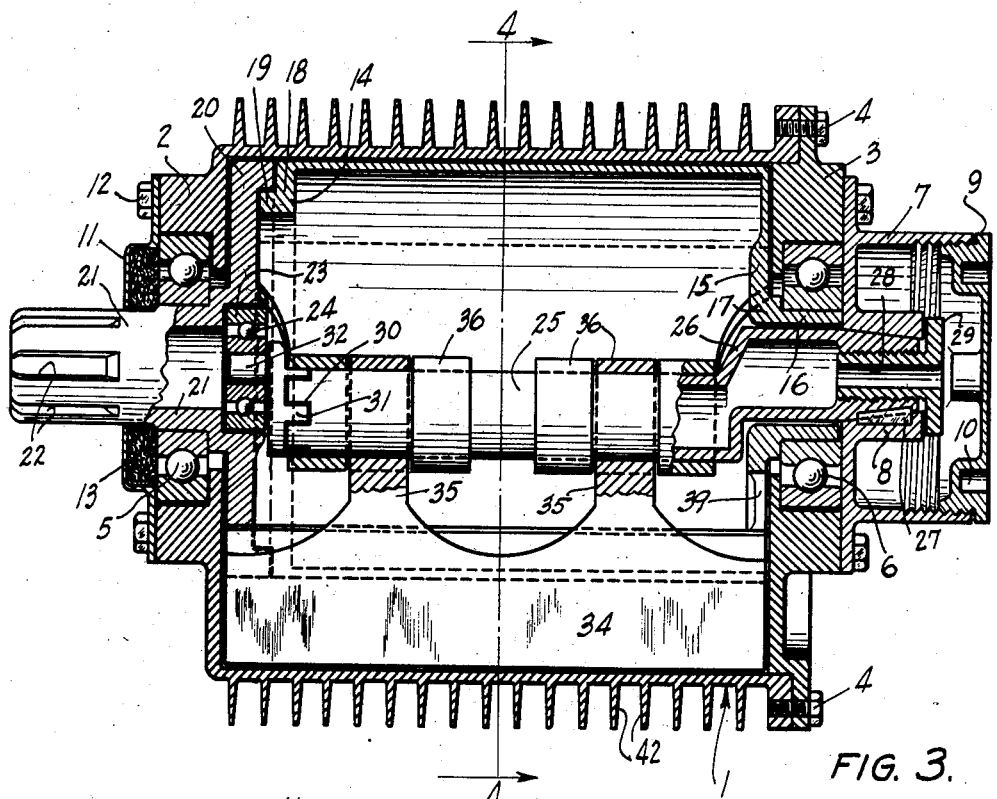
Figure 3 is a longitudinal sectional side elevation of Figure 1.

Swingably mounted upon the shaft 25 are a plurality of vanes or blades 34 which are shaped as shown in Figure 3, and formed with integral projections 35 which terminate in collars or bearings 36 by means of which the blades are rotatably mounted to the shaft. The oil holes 33 are provided at points located within the width of each collar to provide lubricant for each of said collars. The projections, and collars formed integral therewith, are arranged to progressively straddle each other. In other words, one of the vanes is formed with the innermost collars as shown in Figure 3; the collars of the next vane straddle these first two collars, and the collars of the last vane straddle the collars of the other two as shown. This arrangement conserves on space required for rotatably mounting all of the vanes to a common shaft.

The vanes are arranged radially at equidistant points with respect to the inner periphery of the cylinder 1 and project through the drum 14 and are slidably and rockably arranged with respect to the periphery of the drum by means of trunnion blocks 37 which extend throughout the length of the wall of the drum and are rockably mounted with respect thereto by means of the substantially circular and slotted housings 38. To permit passage of the ends of the blades through the end wall 15 of the drum 14 and the end member 20 thereof, I provide slots 39 which are angular in shape, as shown in Figure 4, to permit angular movement of the vanes with respect to said end walls during the operation of the motor, since it is obvious that a circle described by the rotating vanes on one axis, or the shaft 25, would be eccentric with respect to the circle described by the periphery of the drum which rotates on another axis, or its aligned bearings 5 and 6.

The cylinder wall of the cylinder 1 is enlarged as at 40 into an intake chamber, and as at 41 into an exhaust chamber. The outer periphery of the cylinder wall is formed with conventional cooling fins 42 and the enlarged portions 40 and 41 extend entirely through the fins throughout the length of the cylinder. The fins are not relieved or cut out within the intake and exhaust chambers but extend entirely therethrough as shown, and each of said fins within said chambers is provided with a plurality of apertures 43 in alignment with each other from end to end of said cylinder to permit free passage of intake and exhaust fluids during operation of the motor. The intake and exhaust chambers terminate in any approved type of couplings 44 which are formed in open communication with the chambers on the outermost end of the motor housing.

Figure 4:
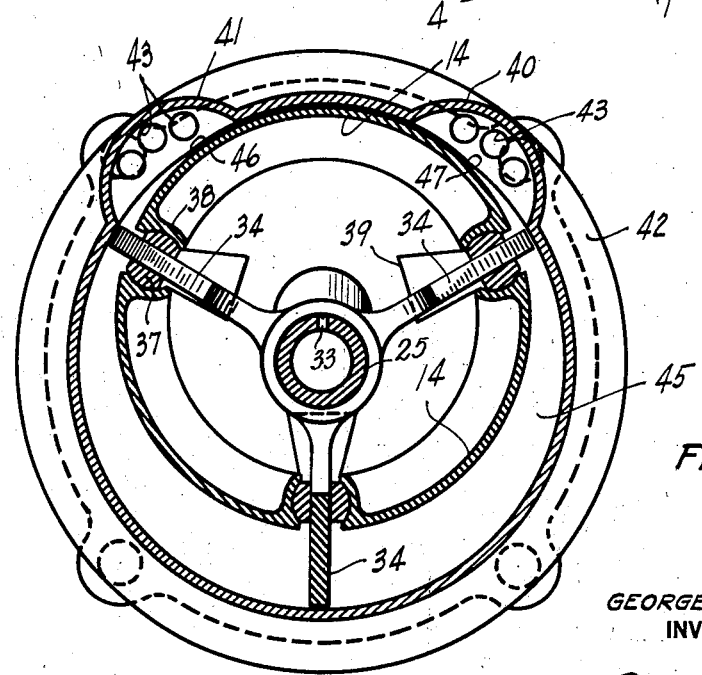
Figure 4 is a sectional end elevation of Figure 3 looking in the direction of the line 4—4 in Figure 3.

In Figure 4 it will be noted that the wall of the cylinder 1 is slightly expanded, between the points indicated at 46 and 47, in curvilinear form to conform precisely to the outer periphery of the drum 14. Between these points the drum and cylinder wall are brought into what might be termed pressureless contact with each other over a relatively large area to establish an absolute seal between the intake and exhaust chambers, as compared with motors of this character which have heretofore been commonly constructed with the eccentrically mounted rotatable member or drum arranged merely in line-contact with the cylinder wall. Obviously, a mere line-contact between the drum and cylinder wall is totally ineffective as a seal, resulting in leakage of fluid and loss of power.

Again referring to Figure 4, it is obvious that the motor will be caused to function by reason of the intake fluid entering through the intake chamber 40 and applying its pressure to the back side of any one of the vanes 34 within the crescent-shaped expansion chamber 45 which as previously stated, is formed by the eccentric arrangement of the drum with respect to the cylinder. The blade of course under pressure is driven in a clockwise direction as viewed in Figure 4 until it sweeps across the exhaust chamber at which time the expanded driving fluid is exhausted and during which rotation power is applied to the shaft 21 and is applicable therefrom to any desired use.

When it is desired to operate the device as a pump, it is obvious that rotary motion applied to the shaft 21 will drive the blades in a corresponding rotary motion with a resultant building up of pressure within the expansion chamber 45 from whence it is directed out through the exhaust chamber 41 and applied to any desired point of use.

While I have shown a particular form of embodiment of my invention, I am aware that many minor changes therein will readily suggest themselves to others skilled in the art without departing from the spirit and scope of my invention. Having thus described the invention, what I claim as new and desire to protect by Letters Patent, is:—

1. In a rotary motor, the combination of a stationary cylinder provided with cooling fins around its outer periphery, an integral end wall for said cylinder and a removable end wall for the opposite end thereof, antifriction bearings mounted within said end walls and in alignment with each other, a drum rotatably mounted within said cylinder by means of said antifriction bearings, said drum being arranged eccentrically with respect to the cylinder, said drum being formed with a removable end wall provided with a hollow shaft extending outwardly therefrom and rotatably mounted within one of said antifriction bearings, the opposite end of said drum being formed with an outwardly projecting hub for rotatable engagement with the other of said antifriction bearings whereby said drum is wholly rotatably supported by said antifriction bearings, a hollow stationary shaft extending at one of its ends through one end wall of said drum and secured to the removable end wall of said cylinder and in alignment with said antifriction bearings, the central and major portion of said hollow shaft being offset into alignment with the major axis of said cylinder, a plurality of vanes rotatably mounted on said hollow stationary shaft and rotatable with said drum, said vanes slidably extending through the walls of said drum by means of trunnion blocks extending longitudinally thereof, the outermost ends of said vanes forming pistons within the chamber formed between said drum and the inner wall of said cylinder.

2. In a motor of the class described, the combination of a cylinder provided with a removable wall at one of its ends and an integral wall at its opposite end, an oil reservoir mounted to said removable cylinder end wall, a hollow shaft rotatably mounted through said removable end wall and in open communication with the interior of said oil reservoir, said shaft being offset for the major portion of its length with respect to its portion that extends through the cylinder end wall, a drum rotatably mounted within the cylinder and concentrically with that portion of said hollow shaft extending through the cylinder end wall, a plurality of vanes rotatably mounted upon the offset portion of said shaft and extending through the walls of said drum for wiping contact with the walls of said cylinder, a plurality of oil holes formed through said hollow shaft to permit flow of lubricant from the interior of the said shaft to the points on said shaft where the vanes are rotatably mounted thereupon, the opposite end of said hollow shaft being splined and engaged with a correspondingly splined disc, a projection formed eccentrically upon said disc and rotatably mounted within a bearing mounted in one end of the drum and around which said drum is free to rotate with respect to said projection, and a splined shaft formed integral with said drum end wall within which said bearing is disposed.

GEORGE E. WATTS.